United States Patent
Bailey et al.

(10) Patent No.: US 6,681,571 B2
(45) Date of Patent: Jan. 27, 2004

(54) DIGITAL CONTROLLED FLUID TRANSLATING DEVICE

(75) Inventors: Brett M. Bailey, Peoria, IL (US); Andrew H. Nippert, Peoria, IL (US)

(73) Assignee: Caterpillar Inc, Peoria, IL (US)

( * ) Notice: Subject to any disclaimer, the term of this patent is extended or adjusted under 35 U.S.C. 154(b) by 105 days.

(21) Appl. No.: 10/023,286

(22) Filed: Dec. 13, 2001

(65) Prior Publication Data

US 2003/0110765 A1 Jun. 19, 2003

(51) Int. Cl.$^7$ .............................................. F16D 39/02
(52) U.S. Cl. .......................................... 60/489; 60/429
(58) Field of Search .......................... 60/489, 425, 428, 60/429, 430, 484, 486

(56) References Cited

U.S. PATENT DOCUMENTS

| | | |
|---|---|---|
| 2,785,638 A | 3/1957 | Moller |
| 3,459,363 A | 8/1969 | Miller |
| 4,241,714 A | 12/1980 | Knape et al. |
| 4,541,394 A | 9/1985 | Schechter et al. |
| 5,190,446 A | 3/1993 | Salter et al. |
| 5,259,738 A | 11/1993 | Salter et al. |
| 5,356,269 A | 10/1994 | Stangroom |
| 5,409,354 A | 4/1995 | Stangroom |
| 5,700,136 A | 12/1997 | Sturman |

OTHER PUBLICATIONS

Dept. of Mechanical Engineering, University of Edinburgh, Scotland, SHSalter, WHSRampen, The Wedding–Cake Multi–eccentr.

ASME vol. 122, 3/2000 Modeling of Digital–Displacement Pump–Motors and Their Application as Hydraulic Drives for Nonunif.

Dept. of Mechanical Engineering—Univ. of Edinburgh, UK, Simulation and Dyanmic Response of Computer Controlled Digital.

FPST–vol. 3 Fluid Power Systems and Technology: Collected Papers ASME 1996.

WRITTEN DISCUSSION—The control of cruciform testing systems using opposed pairs of servo–hydraulic actuators.

Constant Pressure control of the Digital Displacement Hydraulic Piston Pump—W. Rampen, S. Salter & A. Fussey.

Chapter 3—The Digital Displacement Hydraulic Piston PumpWHSRampen & SHSalter (University of Edinburgh, UK).

*Primary Examiner*—Edward K. Look
*Assistant Examiner*—Michael Leslie
(74) *Attorney, Agent, or Firm*—J. W. Burrows

(57) ABSTRACT

The displacement of fluid translating devices are normally controlled by changing the angle of an eccentric or a cam plate to change the pumping stroke of the pistons within the device. In the subject arrangement, the displacement of the fluid translating device is controlled by controlling the flow being delivered into or away from each of the associated pressure chambers defined therein by the respective ones of a plurality of pistons. By not permitting the flow from every piston to be directed into useful work, the volume of fluid being directed into or away from the fluid translating device can be altered. Likewise, the direction of fluid flow within the fluid translating device can be selectively changed thus permitting the subject fluid translating device to be capable of pumping or motoring in both directions of flow relative to the first and second inlet/outlet ports thereof.

23 Claims, 5 Drawing Sheets

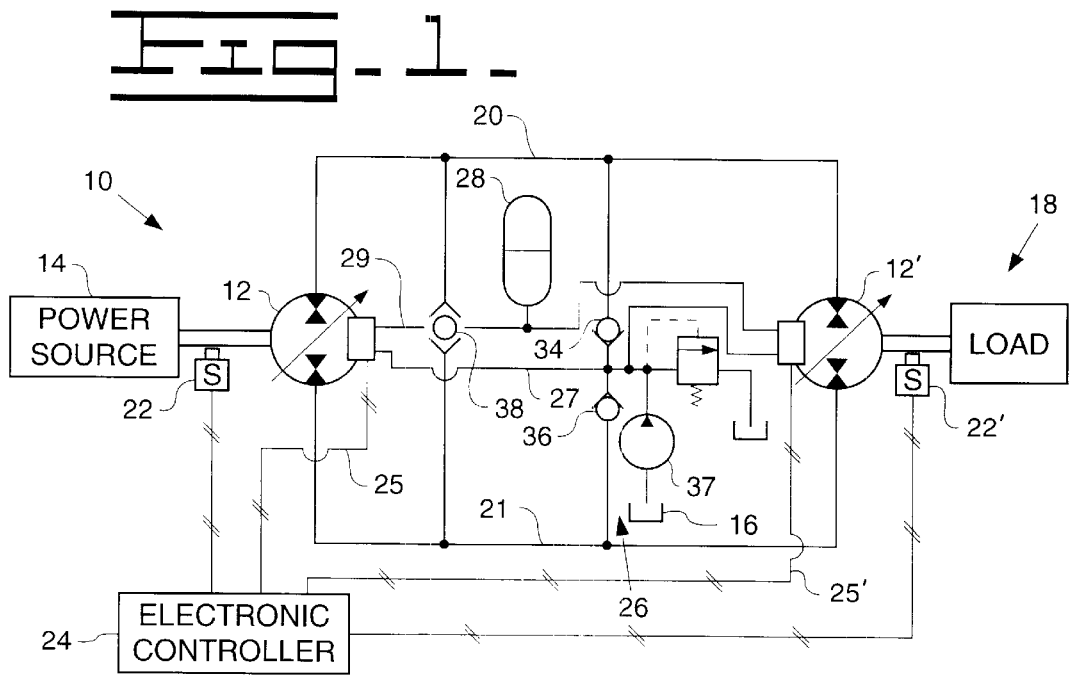
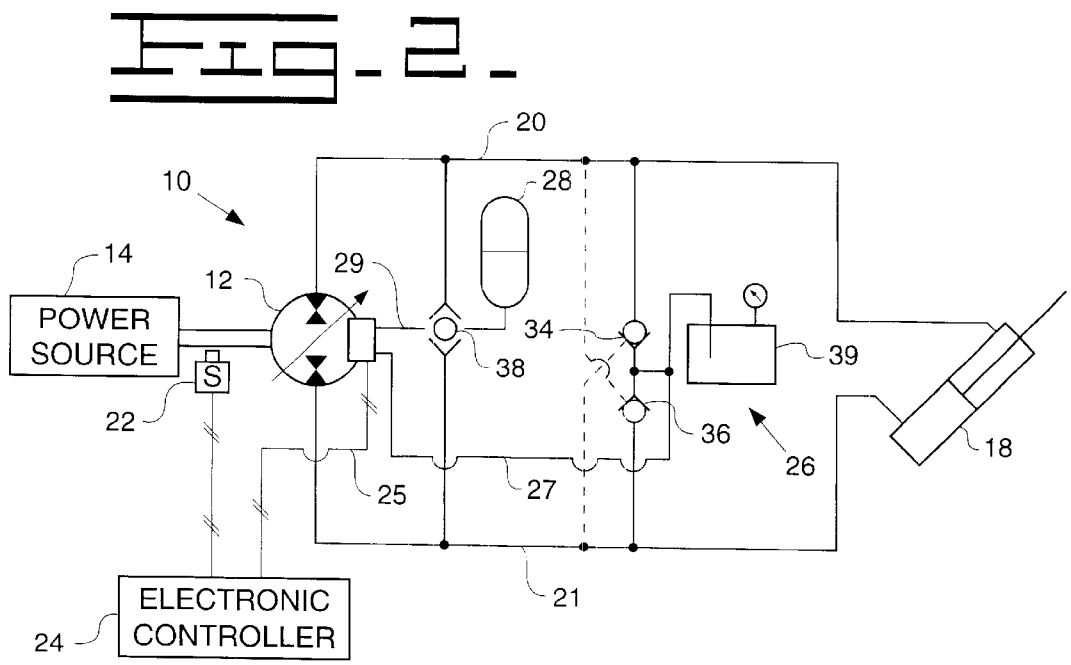

DIGITAL CONTROLLED FLUID TRANSLATING DEVICE

TECHNICAL FIELD

The subject invention generally relates to a variable displacement fluid translating device and more particularly to a digitally controlled variable displacement fluid translating device that is capable of controlling flow in both directions.

BACKGROUND

Variable displacement fluid translating devices are well known in the art and may be in the form of a fluid pump or a fluid motor. The displacement of these known types have typically been controlled by changing the angle of a cam plate, changing an eccentric of a rotating cam or by changing the timing of the inlet and outlet ports therein. The displacement of many of these known pump/motors are capable of operation in an overcenter position. That is, the flow direction with in the pump/motor is changed by the displacement mechanism being moved both directions from a zero displacement position. It is also known to change the displacement of a pump/motor by causing the flow from selected ones of the internal pistons to be bypassed across a solenoid controlled poppet valve to the low pressure side thereof. An example of such a variable displacement pump/motor is set forth in U.S. Pat. No. 5,259,738 issued on Nov. 9, 1993 to the University of Edinburgh. However, the pump/motor arrangement of U.S. Pat. No. 5,259,738 is only capable of operation in a two quadrant mode. It would be beneficial to have a fluid translating device in which the displacement thereof could be changed by controlling the fluid in and out of each individual piston therein and also be operational in a four quadrant mode.

The subject invention is directed to overcoming one or more of the problems as set forth above.

SUMMARY OF THE INVENTION

In one aspect of the present invention, a fluid translating device is provided and comprises a housing, a rotating cam, a plurality of piston bores, a plurality of pistons, a plurality of pressure chambers and a valving arrangement. The housing has first and second inlet/outlet ports and defines a reference axis therethrough. The rotating cam is disposed in the housing along the reference axis and has a cam surface. The plurality of piston bores are defined in the housing about the reference axis and each bore of the plurality of piston bores has a bottom portion. The plurality of pistons are slideably disposed in the plurality of piston bores and are selectively in mating contact with the cam surface of the rotating cam. The plurality of pressure chambers are defined in the housing between the respective one of the plurality of pistons and the bottom portion of the respective ones of the plurality of piston bores. The valving arrangement is connected between selected pressure chambers of the plurality of pressure chambers and the respective first and second inlet/outlet ports. The valving arrangement is operative to selectively control the displacement and the direction of fluid flow in each pressure chamber relative to the first and second inlet/outlet ports.

In another aspect of the present invention, a method of controlling the displacement and the flow direction of fluid within a variable displacement fluid translating device between first and second inlet/outlet ports. The method comprises the following steps: provide a housing having first and second inlet/outlet ports and a reference axis; provide a rotating cam having a cam surface in the housing along the reference axis; form a plurality of piston bores in the housing about the reference axis; provide a plurality of pistons in the plurality of piston bores that are slideably disposed in the respective piston bores and that are selectively in mating contact with the cam surface of the rotating cam; establish a plurality of pressure chambers between the respective one of the plurality of pistons and the respective ones of the plurality of piston bores; and provide a valving arrangement between selected pressure chamber of the plurality of pressure chambers and the respective first and second inlet/outlet ports. In the method each valving arrangement is operative to selectively control displacement and the flow direction in each pressure chamber relative to both of the first and second inlet/outlet ports.

BRIEF DESCRIPTION OF THE DRAWINGS

FIG. 1 is a schematic representation of a work system utilizing the subject invention;

FIG. 2 is a schematic representation of another work system utilizing the subject invention;

DETAILED DESCRIPTION

Figure 3:
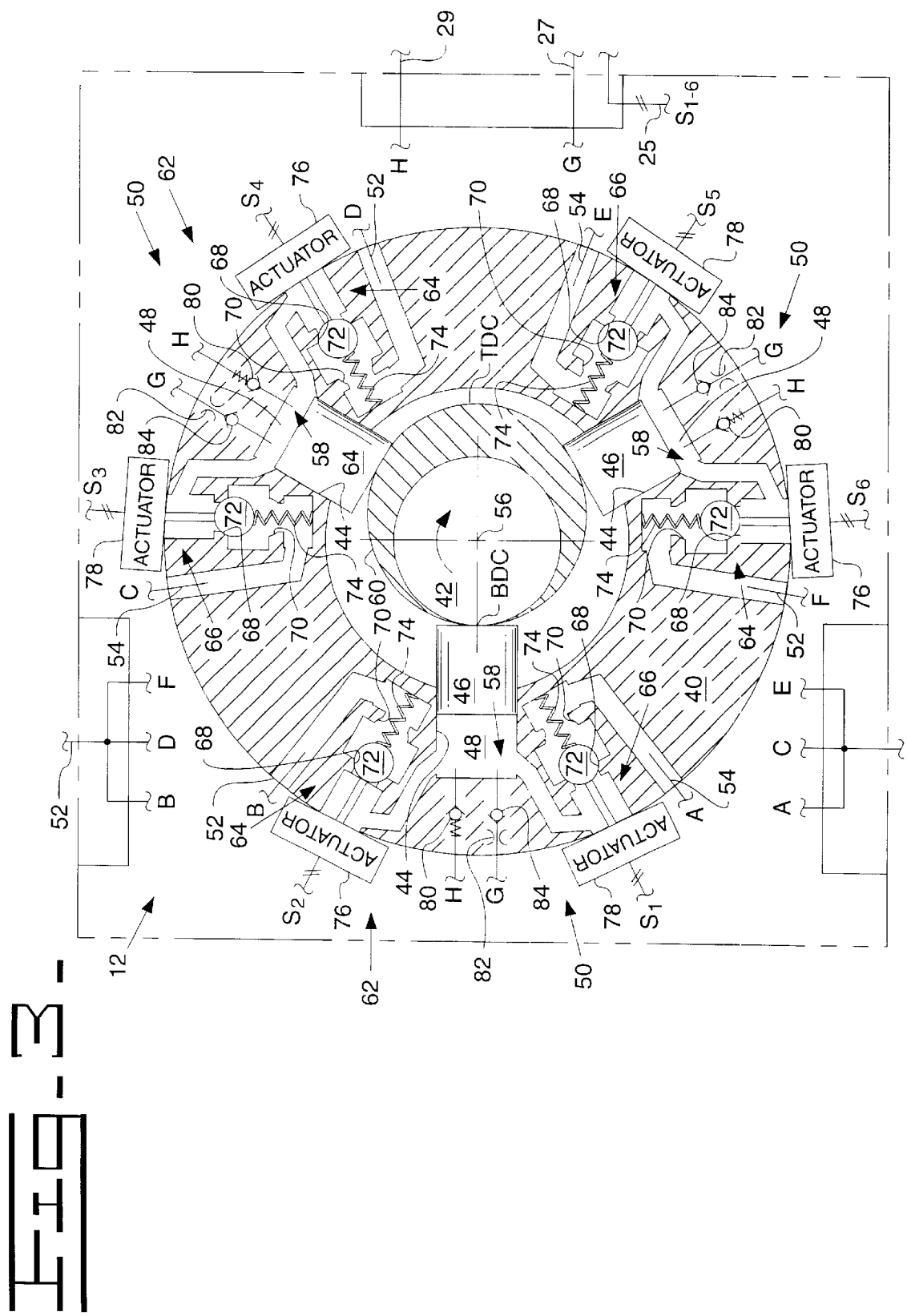
FIG. 3 is a diagrammatic representation of an embodiment of the subject invention.

Referring to FIG. 1, a work system 10 is illustrated. The work system 10 of FIG. 1 includes a power source 14 drivingly connected to a variable displacement fluid translating device 12. A second fluid translating device 12', in the form of a fluid motor, is drivingly connected to a load or work element 18 and is fluidily connected to the first variable displacement fluid translating device 12 by conduits 20,21.

The variable displacement fluid translating device 12 could be a fluid pump or a fluid motor and will be described in more detail hereinafter. Likewise the variable displacement fluid translating device 12 could be a radial, wobble plate, axial or bent axis design. The work system 10 of the subject embodiment could be, for example, a hydrostatic drive arrangement.

Speed and position sensors 22,22' are associated with the variable displacement fluid translating device 12 and are operative to detect the respective speeds of the variable displacement fluid translating devices 12,12' and the rotational position of its internal mechanism. It is recognized that the speed and position sensor 22,22' could be disposed within the respective variable displacement fluid translating device 1212'. The detected speeds and positions are delivered to a controller 24. The controller 24 is also operatively connected by respective wiring harnesses 25,25' to the variable displacement fluid translating devices 12,12'.

A source 26 of low pressure fluid and a high pressure accumulator 28 are also operatively connected by respective conduits 27,29 to the variable displacement fluid translating devices 12,12'. The source 26 of low pressure fluid is connected through first and second one way check valves 34,36 to the respective conduits 20,21. In the subject embodiment, the source 26 of low pressure fluid 26 is a pilot pump 37 that receives fluid from a reservoir 16. The high pressure accumulator 28 is also connected to the first and second conduits 30,32 through a resolver valve 38.

Referring to the work system 10 in the embodiment of FIG. 2, the power source 14 is drivingly connected to the variable displacement fluid translating device 12 which in turn is fluidity connected to the work element 18 by the conduits 20,21. The variable displacement fluid translating device 12 of FIG. 2 also functioning in all four quadrants. The work element 18 of the subject embodiment is a typical fluid cylinder or it could be a well known fluid motor.

The speed and position sensor 22 is connected and functions the same as the speed and position sensor 22 of FIG. 1. Likewise, the controller 24 is connected to the variable displacement fluid translating device 12 by the wiring harness 25.

In the subject embodiment of FIG. 3, the source 26 of low pressure is a pressurized reservoir 39. The first and second one way check valves 34,36 of the subject embodiment are pilot operated one way check valves 34',36' and the source of low pressure fluid 26 is connected through the first and second pilot operated one way check valves 34',36' with the conduits 20,21. The first pilot operated one way check valves 34' is responsive to pressurized fluid in the conduit 20 while the second pilot operated one way check valve 36' is responsive to pressurized fluid in the conduit 21.

The high pressure accumulator 28 is connected with the variable displacement fluid translating device 12 and connected with the first and second conduits 20,21 through the resolver valve 38 in the same manner as that of FIG. 2.

Referring to FIGS. 3–6, different embodiments of the variable displacement fluid translating device 12 are illustrated. The variable displacement fluid translating device 12 of each embodiment includes a housing 40, a rotating cam 42, a plurality of piston bores 44, a plurality of pistons 46, a plurality of pressure chambers 48 and a valving arrangement 50. It is recognized that any number of pistons 46 and piston bores 44 could be utilized in the subject embodiments. The housing 40 has first and second inlet/outlet ports 52,54 and a reference axis 56 extending therethrough.

The plurality of piston bores 44 defined in the housing 40 each has a bottom portion 58 and is defined therein extending radially outward from and about the reference axis 56. Each of the respective piston bores 44 is evenly spaced from one another about the reference axis 56. The plurality of pistons 46 are slideably disposed within the plurality of piston bores 44 to define the plurality of pressure chambers 48 between the bottom portion 58 of each piston bore of the plurality of piston bores 44 and one end of the associated piston of the plurality of pistons 46.

The rotating cam 42 has a cam surface 60 disposed thereon eccentric from the reference axis 56. The amount of eccentricity of the cam surface 60 relative to the reference axis 56 determines the maximum displacement or movement of the respective pistons of the plurality of pistons 46 within their respective plurality of piston bores 44. The other end of the respective pistons 46 is in selective engagement with the cam surface 60 of the rotating cam 42. Once the cam surface 60 on the rotating cam 42 moves the associated one of the pistons 46 into its associated piston bore 44 as far as possible, the one piston 46 is at a top dead center position 'TDC'. When the piston 46 is furthest from the bottom portion 58 of the associated piston bore 44, the piston is at its bottom dead center position 'BDC'.

Figure 4:
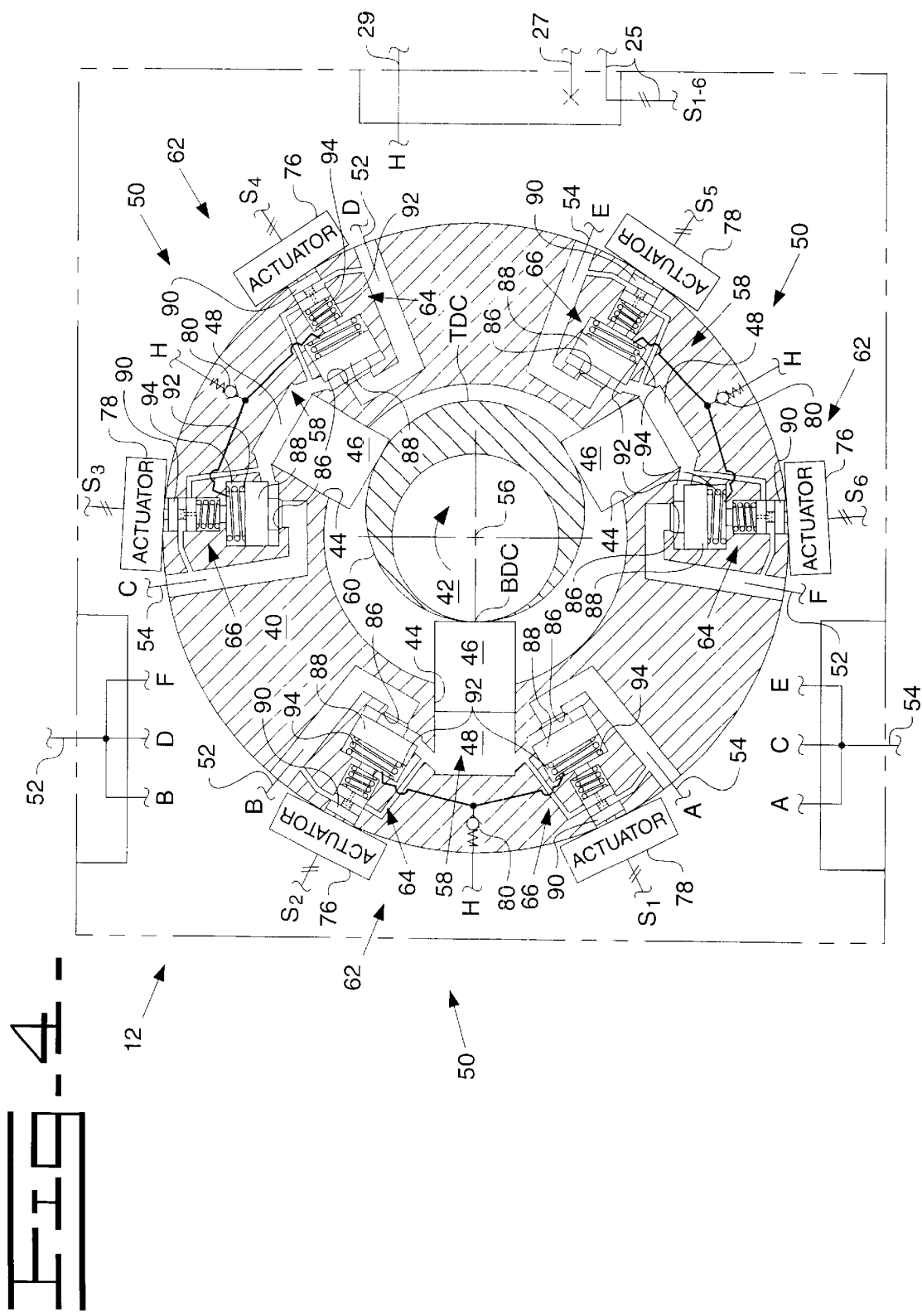
FIG. 4 is a diagrammatic representation of another embodiment of the subject invention.
Figure 5:
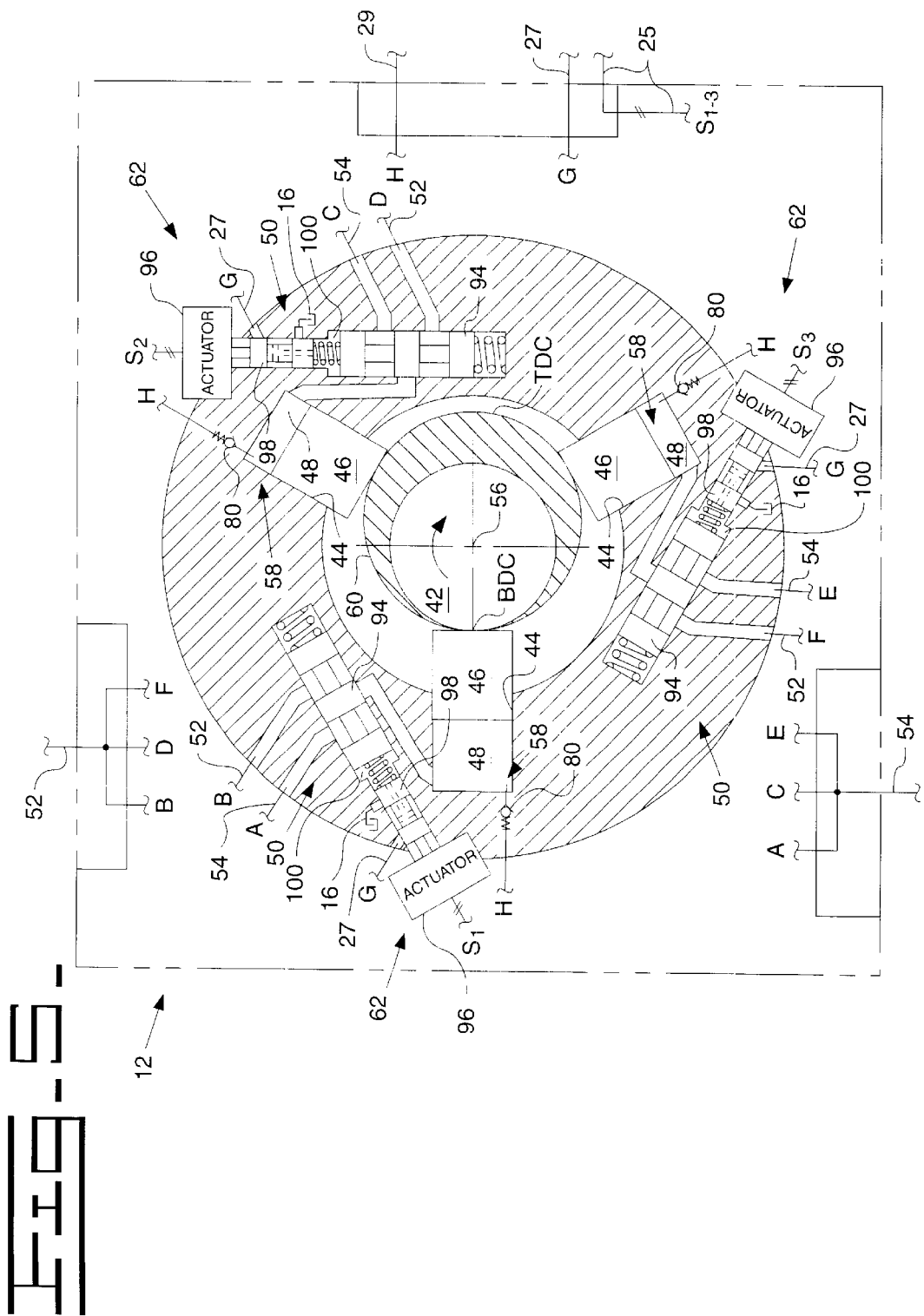
FIG. 5 is a diagrammatic representation of yet another embodiment of the subject invention.

In FIGS. 3–5, each of the valving arrangements 50 is disposed between the respective pressure chambers 48 and the first and second inlet/out ports 52,54. Each of the valving arrangements 50 is movable from a neutral, flow blocking position to an operative, flow passing position in response to respective electrically controlled actuator arrangements 62. The respective electrically controlled actuator arrangements 62 are connected to the controller 24 through the wiring harness 25. Each of the valving arrangements 50 is operative to control the direction of fluid flow between the respective pressure chambers 48 and the first and second inlet/outlet ports 52,54. When the valving arrangement 50 is at its neutral, flow blocking position, the associated piston 46 is held at a predetermined position. The predetermined position in the subject arrangements is at top dead center 'TDC'.

Each of the valving arrangements 50 of FIG. 3 includes first and second valving assemblies 64,66. The first valving assembly 64 is disposed between the respective pressure chambers 48 and the first inlet/outlet port 52 and the second valving assembly 66 is disposed between the respective pressure chambers 48 and the second inlet/outlet port 54. Each of the first and second valving assemblies 64,66 is movable from a neutral, flow blocking position towards an operative, flow passing position.

Each of the first and second valving assemblies 64,66 has first and second valve seats 68,70 disposed therein with a ball check 72 disposed therebetween and operative to be selectively seated between or in one of the first and second valve seats 68,70. A biasing member 74 biasing the respective ball checks 72 into engagement with the first valving seat 68.

Each of the electrically controlled actuator arrangements 62 of the subject embodiment includes first and second electrically controlled actuators 76,78. Each of the electrically controlled actuators 76,78 are connected through the wiring harness 25 to the controller 24 and operative to move the respective ball checks 72 between the first and second valve seats 68,70.

The respective pressure chambers 48 are each connected to the high pressure accumulator 28 through respective relief valves 80 and the conduit 29. It is recognized that the relief valves 80 serve only to vent minimal amounts of fluid at a very low differential pressure since the conduit 29 is connected to the high pressure accumulator 28. The respective pressure chambers 48 are also connected to the source of low pressure fluid through respective orifices 82 and one way check valves 84.

Referring to the embodiment of FIG. 4, like elements have like element numbers. Each of the first and second valving assemblies 64,66 of the valving arrangement 50 in FIG. 4 includes a single valve seat 86 and a pilot operated poppet valve 88. Each of the pilot operated poppet valves 88 is urged into seating engagement with the single valve seat 86 in response to actuation of respective pilot valves 90. The respective pilot valves 90 are disposed between the associated pilot operated poppet valves 88 and the associated electrically controlled actuators 76,78 and each is operative in response to the associated electrically controlled actuators 76,78 to hold the pilot operated poppet valve 88 in the neutral, flow blocking position or to permit it to open to the operative, flow passing position. The respective pilot valves 90 of each of the first and second valving assemblies 64,66 are connected between the associated pressure chamber 48 and the associated one of the first and second inlet/outlet ports 52,54. Movement of the respective pilot valves 90 function to control the pressure of fluid in a pilot control chamber 92 behind the respective pilot operated poppet valves 88. A light weight spring 94 is disposed in the pilot control chamber 92 and functions to urge the pilot operated poppet valve 88 to the neutral, flow blocking position. It is recognized that the pilot valves 90 could be removed and the respective first and second electrically controlled actuators 76,78 could be connected directly to the associated pilot operated poppet valves 88.

Referring to the embodiment of FIG. 5, like elements have like element numbers. The valving arrangement 50 of FIG. 5 has a single valving element 94 and a single electrically controlled actuator 96 associated therewith through a single pilot valve 98. It is recognized that the single electrically controlled actuator 96 could be connected directly to the single valving element. The single valving element 94 is disposed between the respective pressure chambers 48 and the first and second inlet/outlet ports 52,54 and is movable between a neutral, flow blocking position and first and second operative positions. At the neutral position, all flow to and from the respective pressure chambers 48 is blocked. In the first operative position, the first inlet/out port 52 is in communication with the associated pressure chamber 48 and the second inlet/outlet port 54 is blocked therefrom. In the second operative position, the second inlet/out port 54 is in communication with the associated pressure chamber 48 and the first inlet/outlet port 52 is blocked therefrom.

The single pilot valve 98 is disposed between the single valving element 94 and the single electrically controlled actuator 96 and operative to control the fluid within a single pilot control chamber 100. The single pilot valve 98 controls communication of fluid between the source of low pressure fluid 26, the single pilot control chamber 100 and the reservoir 16.

Figure 6:
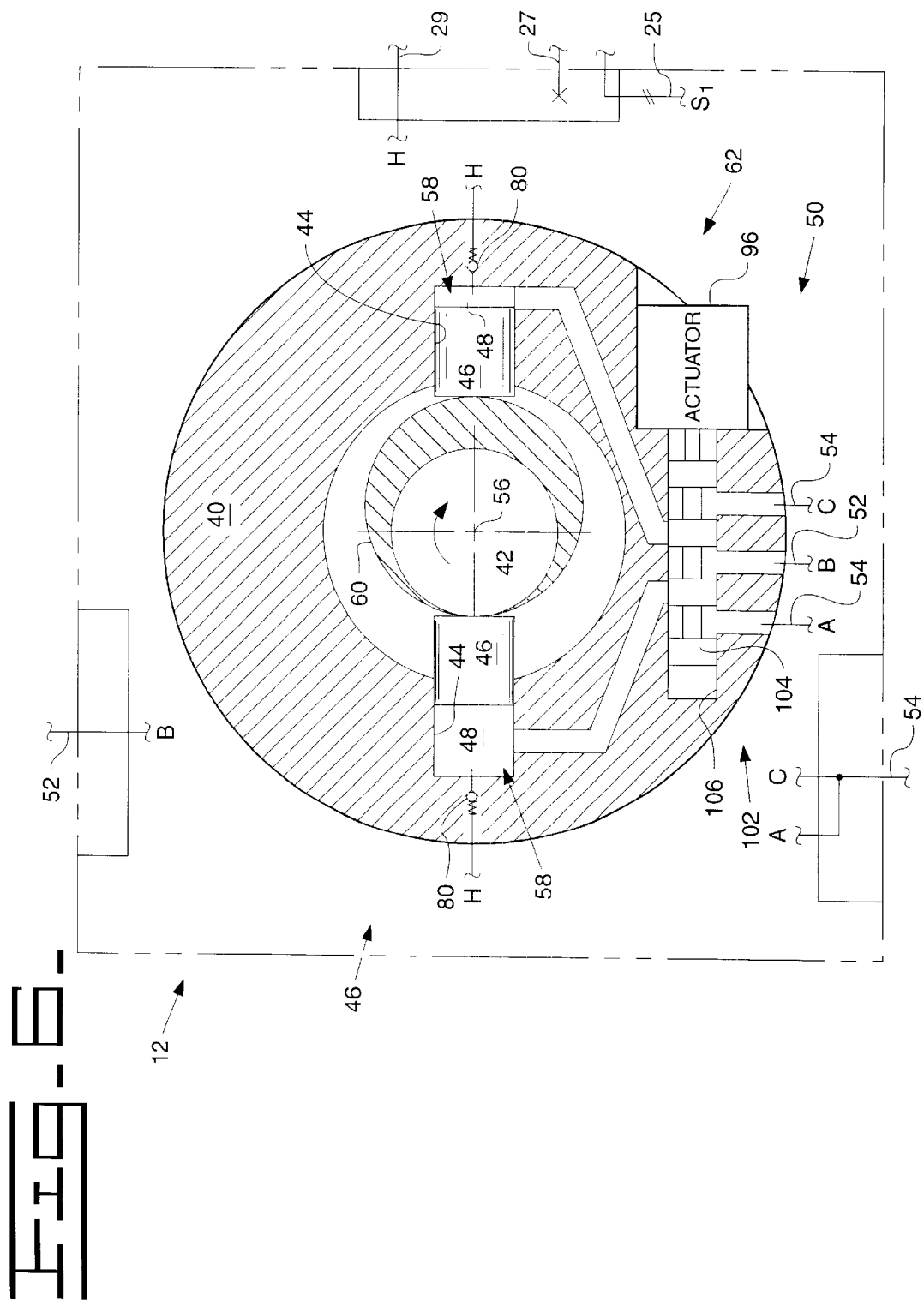
FIG. 6 is a diagrammatic representation of yet another embodiment of the subject invention.

Referring to the embodiment of FIG. 6, like elements have like element numbers. The plurality of pistons 46 and associated plurality of piston bores 44 of FIG. 6 includes a plurality of diametrically opposed pistons 46 and associated bores 44 arranged along the reference axis 56. FIG. 6 shows only the cross section of one of the plurality. The cam surface 60 of the rotating cam 42 is in contact with both of the pistons 44. It is recognized that the rotating cam 42 does have a plurality of cam surfaces thereon spaced from one another along the reference axis 56 and that the other plurality of opposed piston 44 are also associated with the respective ones of the plurality of cam surfaces. The eccentric of each of the cam surfaces 60 is oriented at different positions on the rotating cam 42 about the reference axis 56. It is recognized that an equivalent configuration could have two adjacent cam surfaces oriented 180 degrees apart around the cam with the pistons positioned adjacent each other and in operative engagement with the respective cam surfaces. This type of fluid translating device 12 is more typically used as a low speed, high torque motor but it is not limited to use only as a fluid motor.

In the subject embodiment, the respective pressure chambers 48 are connected to the high pressure accumulator through the respective relief valves 80. The relief valves 80 function to control any over pressure conditions in the respective pressure chambers 48 and to bypass pressurized fluid during a portion of the operation thereof.

The valving arrangement 50 includes a single valving assembly 102 connected to each of the plurality of pistons and associated piston bores that are extended along the reference axis and the electrically controlled actuator arrangement 62 includes the single electrically controlled actuator 96.

The single valving assembly 102 is disposed in the housing 40 between respective ones of the two pressure chambers 48 and the first and second inlet/outlet ports 52,54. Each of the single valving assembly 102 includes a valving element 104 slideably disposed in a spool bore 106 and is movable in response to the respective single electrically controlled actuator 96 between a neutral, flow blocking position and first and second operative positions. At the neutral, flow blocking position, the two pressure chambers 48 are blocked from the first and second inlet/outlet ports 52,54. At the first operative position, one of the two pressure chambers 48 is in communication with the first inlet/outlet port 52 and the other one of the two pressure chambers 48 is in communication with the second inlet/outlet port 54. At the second operative position, the one pressure chamber of the two pressure chambers 48 is in communication with the second inlet/outlet port 54 and the other pressure chamber thereof is in communication with the first inlet/outlet port 52.

FIGS. 1–6 set forth a method of controlling the displacement and the flow direction of fluid within a variable displacement fluid translating device. Various ones of the following steps are utilized in accomplishing this method. For example, some of the steps include providing a housing 40 having first and second inlet/outlet ports 52,54 with a reference axis 56 extending therethough; providing a rotating cam 42 having a cam surface 60 in the housing 40 along the reference axis 56; forming a plurality of piston bores 48 in the housing 40; providing a plurality of pistons 46 in the plurality of piston bores 48 that are slideably disposed therein and that are selectively in mating contact with the cam surface 60 of the rotating cam 42; establishing a plurality of pressure chambers 48 between the plurality of pistons 46 and the respective ones of the plurality of pressure chambers 48; and providing a valving arrangement 50 between selected pressure chambers 48 and the respective ones of the first and second inlet/outlet ports 52,54. Each of the valving arrangements 50 being operative to selectively control the displacement and the flow direction in each pressure chamber relative to the first and second inlet/outlet ports 52,54. Other steps include moving the respective pistons 46 a predetermined distance within the associated piston bore 44 and controlling the direction of flow into and out of the respective pressure chambers 48 for only a portion of the predetermined distance. Another step includes providing two valving assemblies, one of the valving assemblies being disposed between the respective pressure chamber and the first inlet/outlet port and the other one of the valving assemblies being disposed between the respective pressure chamber and the second inlet/outlet port Yet another step includes providing a controller 44 operatively connected to the variable displacement fluid translating device 12 and a speed and position sensor 22 associated with the variable displacement fluid translating device 12 that is operative to sense the speed and rotational position of the variable displacement fluid translating device 12 and direct a signal representative thereof to the controller 24.

It is recognized that various other embodiments of the variable displacement fluid translating device 12 and combinations of the work system 10 could be utilized without departing from the essence of the present invention.

INDUSTRIAL APPLICABILITY

In the operation of the work system 10 of FIG. 1, the variable displacement fluid translating device 12 (pump) and the second variable displacement fluid translating device 12' (motor) each operate in the four quadrant mode. Consequently, each of the first and second inlet/outlet ports 52,54 serve as high and low pressure ports depending on the operating parameters of the work system 10. It is recognized that the second variable displacement fluid translating device 12' would not have to be a variable displacement motor. The work system 10 of FIG. 2 is a typical hydrostatic system in which the fluid pump 12 and the fluid motor 12' are fluidity connected together. The pilot pump 37 provides low pressure fluid through the first and second one way check valves 34,36 to both the conduits 20,21 and the fluid pump 12 and fluid motor 12'. The high pressure accumulator 28 is maintained at the highest system pressure level by its connection through the resolver valve 38 to the respective conduits 20,21 and is also connected to the fluid pump 12 and fluid motor 12' in order to receive any fluid resulting from an overpressure condition within the pump 12 or motor 12' and also functions to reduce fluid pressure ripples and/or fluid borne noise.

The speed and position sensors 22,22' functions to continually sense and deliver a signal to the controller 24 representative of the speed of the fluid pump 12 and the fluid motor 12'. Likewise, it also functions to continually monitor and deliver a signal to the controller 24 representative of the position of the rotating cam 42 within the fluid pump 12 and the fluid motor 12'. The controller 24 functions to control the displacement of the fluid pump 12 and fluid motor 12' relative to the operating parameters of the total work system 10.

In the work system 10 of FIG. 2, the variable displacement fluid translating device or pump 12 operates in the four quadrant mode like that of FIG. 1. However, the work element 18 of FIG. 2 is a typical fluid actuator 18. The pressurized fluid reservoir 39 serves as the source of low pressure fluid 26 and is connected to the conduits 20,2 1 through the respective pilot operated one way check valves 34',36'. When the pressure in the conduit 20 is at a higher pressure level than that in conduit 21, the pilot operated one way check valve 36' is forced to open in response to the higher pressure in conduit 20 and the pressure in the conduit 21 is maintained at least at the level of the pressure in the pressurized reservoir 39. When the pressure in the conduit 21 is higher than that in the conduit 20 the opposite occurs. The pressurized fluid in the pressurized reservoir 39 is also connected to the fluid pump 12 to provide the source of low pressure fluid 26 that will be explained below. All other operating aspects of the work system 10 of FIG. 2 is the same as that of FIG. 1.

Referring to the variable displacement fluid translating device 12 of FIG. 3, hereinafter referred to as a fluid pump 12, the operation thereof is described with it being used as a fluid pump 12. However, it is recognized that it is also applicable as a fluid motor. As the rotating cam 42 of the fluid pump 12 rotates, the plurality of pistons 40 are forced to reciprocate within the plurality of piston bores 44 due to the fact that they are in mating contact with the cam surface 60 of the rotating cam 42. As the rotating cam 42 rotates with respect to the plurality of pistons 46 from the bottom dead center position BDC towards the top dead center position TDC, the fluid in the respective ones of the plurality of pressure chambers 48 is forced out towards the first inlet/outlet port 52. In order for the fluid within the respective pressure chambers 48 to get to the first inlet/outlet port 52, the fluid must pass through the first valve seat 68 pass by the ball check 72 to the first inlet/outlet port 52 or pressure side of the fluid pump 12 leading to the work element 18. Simultaneously, fluid must be received from the second inlet/outlet port 54 or low pressure side and delivered to the pressure chambers 48 from which the associated pistons 46 are moving from the top dead center TDC position towards the bottom dead center position BDC. In order for fluid from the low pressure side to get to the pressure chambers 48 that are being filled, the ball check 72 seated on the second valve seat 70 must be moved. This is accomplished by the controller 24 directing a signal to the second electrically controlled actuator 78 which then forces the ball check 72 thereof to the operative, flow passing position. In this pumping mode, the ball check 72 is moved to a position between the first and second valve seats 68,70. As long as the pumping mode remains active pressurized fluid at full displacement is pumped through the first inlet/outlet port 52 to the work element 18.

When the fluid pump 12 is operating in a work system requiring the four quadrant mode and the fluid direction is reversed, the opposite occurs. That is, the first valving assembly 64 is actuated and the second valving assembly 66 remains in its unactuated position with the ball check 72 seated against the first valve seat 68.

In order for the fluid pump 12, to operate in the motoring mode, both of the first and second electrically controlled actuators 76,78 need to be energized at the same time during the intake stroke to move the ball checks 72 of the first and second valving assemblies 64,66 against their respective second valve seats 70. During the exhaust stroke, both of the first and second electrically controlled actuators 76,78 are de-energized to permit both of the ball checks 72 to return to the respective first valve seats 68.

In the event of over pressurization within either of the pressure chambers 48, the associated relief valve 80 opens to vent fluid therefrom to the high pressure accumulator 28 thus removing the over pressure condition. During initial startup of the subject fluid pump 12, it may be necessary to introduce pressurized fluid into the respective pressure chambers 48. The orifice 82 and one way check 84 function to permit a small amount of low pressure fluid to be introduced into the respective pressure chambers 48 during startup. After startup, the one way check 84 blocks reverse flow from the pressure chambers 48 to the source of low pressure fluid 26.

In order to vary the displacement of the fluid pump 12, any one or more of the plurality of pistons 46 are selectively stopped thus removing its effective volume of fluid from the total volume. This is accomplished by continuously holding the ball check 72 of the second valving assembly 66 in a position between the first and second valve seats 68,70 while leaving the ball check 72 of the first valving assembly 64 seated against the first valve seat 68. This permits the selected piston or pistons 46 to continue to reciprocate in and out. However, during the pumping stroke the fluid being expelled is being directed back to the second inlet/outlet port 54 through the second, open valving assembly 66. If the flow direction through the fluid pump 12 is reversed, the ball check 72 of the first valving assembly 66 is positioned between the first and second valve seats 68,70 while the ball check 72 of the second valving assembly 66 remains against the first valve seat 68 thereof.

The displacement of the fluid pump 12 can also be varied by controlling the volume that each piston 46 can produce. This is accomplished by permitting the selected one or ones of the pistons 46 to effectively pump a portion of their total volume and bypass the remaining portion. Likewise, it is possible to pump a first portion of the volume, bypass an intermediate portion and pump the remaining portion of the total volume of fluid. This is accomplished by the controller 24 selectively controlling actuation of the second valving assembly 66 between it neutral and operative positions.

In order to totally stop the flow of fluid into and out of the selected piston or piston 46 in either direction of fluid flow, both of the first and second electrically controlled actuators 76,78 are de-energized just prior to the respective selected piston or pistons 46 reaching their top dead center TDC positions. Consequently, the respective selected piston or pistons 46 are hydraulically locked or stopped at the top dead center position TDC and do not reciprocate in and out until it is desired to recombine their flows into the total flow output. When it is desired to activate the deactivated selected piston or pistons 46, the second electrically controlled actuator 78 is energized near top dead center TDC, assuming that the flow direction is towards the first inlet/outlet port 52, to move the ball check 72 of the second valve assembly 66 towards the second valve seat 70.

In the operation of the variable displacement fluid translating device 12 of FIG. 4, all aspects with respect to the operation of FIG. 3 is the same except the first and second valving assemblies 64,66 are different. When the pressurized fluid flow is in the direction of the first inlet/outlet port 52, the second valving assembly 66 that is associated with each of the pistons that are forcing fluid out of the respective pressure chambers 48 is actuated and the first valving assembly 64 of each remain unactuated. Consequently, the pressurized fluid in the associated pressure chambers 48 act on the pilot operated poppet valve 88 urging it towards the operative, flow passing position to direct the pressurized fluid to the inlet/outlet port 52. The pilot valve 90 of the first valving assembly 64 acts to block the pressure in the respective pressure chamber 48 from the pilot control chamber 92 and permit the pressure at the inlet/outlet port 52 to be communicated with the pilot control chamber 92. The pressure in the pressure chamber 48 acting on the pilot operated poppet valve 88 is sufficient to move the pilot operated poppet valve 88 towards its open position.

At the same time, the pilot valve 90 of the second valving assembly 66 is actuated to move it to a position to communicate the pressure in the pressure chamber 48 to the pilot control chamber 92 of the second valving assembly 66 and blocks the communication of the pressure at the second inlet/outlet port 54 with the pilot control chamber 92 thereof. Consequently, the higher pressure being subjected to the pilot control chamber 92 of the second valving assembly 66 maintains the pilot operated poppet valve 88 of the second valving assembly 66 in its neutral, flow blocking position.

Once all of the fluid has been expelled from the respective pressure chambers 48 and the associated pistons 46 begin to retract, the pressure within the pressure chambers 48 thereof is quickly reduced. Since the pressure of the fluid at the first inlet/outlet port 52 is communicated with the pilot control chamber 92 of the first valving assembly 64, the pilot operated poppet valve 88 thereof is held firmly against its valve seat 86. Since the pressure of the fluid in the pilot control chamber 92 of the second valving assembly 66 is also in communication with the lowered pressure in the pressure chambers 48, the pressure of the fluid at the second inlet/outlet port 54 is sufficient to open the pilot operated poppet valve 88 of the second valving assembly 66 to fill the pressure chambers 48 as they retract. If fluid flow is in the opposite direction, the opposite operation would occur.

In the motoring mode of operation, both of the first and second valving assemblies 64,66 are actuated during the intake stroke, i.e. when receiving high pressure. During the exhaust stroke, both are returned to their unactuated positions. Typically, to aid in timing, just before BDC the electrically controlled actuator 76/78 of the associated valving assembly 64/66 on the high pressure side of the pump 12 is de-energized and the electrically controlled actuator 76/78 of the associated valving assembly 64/66 on the low pressure side of the pump 12 is de-energized at BDC. Likewise, just before TDC the valving assembly 64/66 of the low pressure side is actuated and the valving assembly 64/66 on the high pressure side is actuated at TDC. Thereafter, the whole cycle repeats.

In the event of an over pressure condition within the respective pressure chambers 48, the respective pilot control chambers 92 of the first and second valving assemblies 64,66 are connected to the relief valve 80. Consequently, any over pressure condition can be released across the associated one of the pilot operated poppet valves 88 of the first and second valve assemblies 64,66 to one of the first and second inlet/outlet ports 52,54.

In order to vary the displacement of the fluid pump 12 with the direction of fluid flow being towards the first inlet/outlet port 52, the second valving assembly 66 of a selected one or ones of the pistons 46 that are expelling fluid remains unactuated along with the first valving assembly being unactuated. Consequently, the fluid being pressurized in the associated pressure chamber 48 acts on the pilot operated poppet valve 88 of the second valving assembly 66 and urges it towards its open position thus directing the fluid to the second, low pressure inlet/outlet port 54. Once the associated piston 46 reaches the TDC position, the second valving assembly 66 is actuated and the pressure chamber 48 fills with fluid as the piston 46 retracted from the piston bore 44.

The displacement of the fluid pump 12 can also be varied by permitting a selected one or ones of the pistons 46 to pump only a portion of their total volume and bypass the remaining portion to the low pressure side. This is accomplished by the controller 24 selectively controlling the actuation of the second valving element 66. Since the velocity of the respective pistons 46 are their highest at a position between the bottom dead center position BDC and the top dead center positions TDC, it may be advantageous to use only the first and/or last portions of the total volumes and bypass the mid portion thereof.

In order to reduce the total required energy in the work system 10, the fluid flow that is not being used for useful work can be eliminated. By leaving the second valving assembly 66 unactuated when the piston 46 reaches the TDC position, the piston 46 is hydraulically locked at the TDC position. When it is desired to once again increase the pumps displacement, the second valving assembly 66 is actuated at the TDC position so that the pressure chamber 48 can refill and the piston 46 again contacts the cam surface 60 and retracts as the rotating cam turns. Naturally, if the flow direction is in the direction of the second inlet/outlet port 54, the operation would be just the opposite.

In the operation of the embodiment of FIG. 5, all aspects with respect to the operation of FIG. 4 is the same except the valving arrangement 50 of FIG. 6 only has a single valving element 94 connected between the respective pressure chambers 48 and the first and second inlet/outlet ports 52,54 and the respective pressure chambers 48 are connected through respective relief valves 80 to the high pressure accumulator 28 to control overpressure conditions.

When the flow of fluid is towards the first inlet/outlet port 52, the single valving element 94 is moved from its neutral, flow blocking position towards its first operative position to direct pressurized fluid from the pressure chamber 48 of the pistons 46 that are expelling fluid to the first inlet/outlet port 52. At the same time, the single valving element 94 of the pressure chambers 48 that are being filled due to the pistons 46 retracting is moved from its flow blocking position to its second operative position to connect the associated pressure chambers 48 to the second inlet/outlet port 54. When the pistons 46 that are pumping pressurized fluid reaches their respective TDC positions, the single valving element 94 associated therewith moves from the first operative position towards the second operative position. Likewise, when the pistons 46 that are retracting reaches their respective BDC positions, the single valving element 94 associated therewith moves from their second operative position towards their first operative positions. If the flow direction is changed towards the second inlet/outlet port 54, the reverse operation occurs.

When it is desired to reduce the displacement from the pump 12 with the flow in the direction of the first inlet/outlet port 52, a selected one or ones of the single valving elements 94 is moved from its neutral, flow blocking position towards its second operative position to connect the associated pressure chamber 48 to the second inlet/outlet port 54 that is functioning as the low pressure port. The single valve element 94 of the selected one or ones of the pistons that are not being used to provide useful flow remains in the second operative position until the flow therefrom is again needed to do useful work.

As set forth with respect to FIGS. 3 and 4, it is also possible to vary the volume of fluid delivered from the embodiment of FIG. 6 by using only a portion of the total volume being pumped from the respective pressure chambers 48. The controller 24 controls the operation of the respective single valving members 94 to direct portions of the pumped fluid to the high pressure side and to bypass other portions thereof to the low pressure side.

In order to eliminate the wasted energy in the system due to the pumping of flow that is not being used to do useful work, the piston 46 that is being bypassed is stopped at TDC and not permitted to move. This is accomplished by maintaining the single valving element 94 of the selected one or ones of the pistons 46 being bypassed in its neutral, flow blocking position. With the single valving element 94 in its neutral position, the associated piston is hydraulically locked at that position. Consequently, the cam surface 60 separates from the piston 46. Once the flow from the stopped piston is needed, the single valving element 94 is moved to its first operative position as set forth above.

Referring to FIG. 6, as the rotating cam 42 rotates in the motoring mode, the one piston 46 is moved from the top dead center position TDC towards the bottom dead center position BDC while the other one of the pistons 46 simultaneously moves from the bottom dead center position BDC towards the top dead center position TDC. As the rotating cam 42 rotates, the valving element 104 of the single valve assembly 102 is moved between its first and second operative positions. When the direction of flow is from the first inlet/outlet port 52 towards the second inlet/outlet port 54, the valving element 104 is moved towards the first operative position so that the fluid within the pressure chamber 48 of the one piston 46 is connected to the first inlet/outlet port 52 while fluid from the second inlet/outlet port 54 is connected to the pressure chamber 48 of the other piston 46 to exhaust the pressure chamber 48 therein. It is recognized that simultaneously the other ones of the plurality of pistons 46 and associated piston bores 44 are functioning in the same manner. In order to change the flow direction, the respective valving elements 104 are moved to their second operative position and thus the operation is reversed.

When the variable displacement fluid translating device 12 of FIG. 6 is operated as a fluid pump and the first inlet/outlet port 52 is the low pressure port, the valving element 104 is moved to its second operative position so that pressurized fluid is directed to the pressure chamber 48 of the other piston 46 and simultaneously, the fluid within the pressure chamber 48 of the one piston 46 is expelled to the high pressure, second inlet/outlet port 52. In order to reverse the flow direction in the fluid pump 12, the valving element 104 is moved to its first operative position and the operation is reversed.

In order to vary the displacement of the subject fluid motor/pump, one of the single valve assemblies 102 is moved to its neutral, flow blocking position. Since the flow from the respective two pistons is blocking from either of the first and second inlet/outlet ports 52,54 there is no flow being used from the associated one of the plurality of pistons 46 and associated piston bores 44. The remaining ones of the plurality is still operating in the normal maimer. Whenever the selected one or ones of the single valving assembly 102 is moved to its neutral flow blocking position, at least one or both of the two pistons 46 will be at some position other than top dead center TDC. Since the single valve assembly is blocking the exiting or entry of fluid with respect to the associated pressure chambers 48, the fluid is potentially trapped therein. However, as the rotating cam 42 continues to rotate, the one piston 46 that is moving towards bottom dead center BDC stops and momentarily separates from the rotating cam 42. The other piston 46 continues to move towards top dead center TDC. The fluid in the associated pressure chamber 48 is force out across the relief valve 80. Once the piston 46 reaches the top dead center position TDC, the piston separates from the cam surface 60 and remains at the top dead center position TDC. If the other piston 46 was not at the top dead center position TDC when the single valve assembly 102 was moved to the neutral position, the cam surface 60 of the rotating cam 42 will again contact the one piston 46 and move it to the top dead center position TDC. The fluid therein is also forced across the relief valve 80. When it is desired to re-add the flow from the one of the plurality of pistons 46 and associated piston bores 44, the single valve assembly thereof is moved back to an operative position.

In view of the foregoing, it is readily apparent that the subject fluid translating device 12 provides a fluid pump or a fluid motor that is capable of varying the flow within the fluid translating device 12 and also be operable in all four quadrants of operation. Likewise, the flow may be varied by either bypassing all or part of the flow to or from either one or more of the individual pumping or motoring chambers.

Other aspects, objects and advantages of the invention can be obtained from a study of the drawings, the disclosure and the appended claims.

What is claimed is:

1. A variable displacement fluid translating device, comprising:
   a housing having first and second inlet/outlet ports and defining a reference axis therethrough;
   a rotating cam disposed in the housing along the reference axis and having a cam surface;
   a plurality of piston bores defined in the housing about the reference axis and each bore of the plurality of piston bores having a bottom portion;
   a plurality of pistons slideably disposed in the plurality of piston bores and selectively in mating contact with the cam surface of the rotating cam;
   a plurality of pressure chambers defined in the housing between the respective one of the plurality of pistons and the bottom portion of the respective ones of the plurality of piston bores; and a valving arrangement connected between selected pressure chambers of the plurality of pressure chambers and the respective first and second inlet/outlet ports and being operative to selectively control displacement and the direction of pressurized fluid flow in each pressure chamber relative to the first and second inlet/outlet ports.

2. The variable displacement fluid translating device of claim 1 including an electrically controlled actuator arrangement operatively connected to each of the respective valving arrangements.

3. The variable displacement fluid translating device of claim 2 wherein the valving arrangement includes a single valving element movable between first and second operative positions to connect the associated one of the plurality of pressure chambers with the first and second inlet/outlet ports and the electrically controlled actuator arrangement includes a single electrically controlled actuator connected to the single valving element.

4. The variable displacement fluid translating device of claim 3 wherein at the first operative position of the single valving element, the one pressure chamber is connected to the first inlet/outlet port and blocked from the second inlet/outlet port and at the second operative position of the single valving element, the one pressure chamber is connected to the second inlet/outlet port and blocked from the first inlet/outlet port.

5. The variable displacement fluid translating device of claim 4 wherein a second one of the plurality of pistons having another pressure chamber associated therewith is disposed diametrically opposite to the one piston and the valving element is disposed between the one and another pressure chambers and the first and second inlet/outlet ports.

6. The variable displacement fluid translating device of claim 5 wherein at the first operative position of the single valving element, the one pressure chambers are in communication with the first inlet/outlet port and the another pressure chambers are in communication with the second inlet/outlet port and at the second operative position of the valving element, the another pressure chambers are in communication with the first inlet/outlet port and the one pressure chambers are in communication with the second inlet/outlet port.

7. The variable displacement fluid translating device of claim 4 wherein the plurality of pistons and pressure chambers are evenly spaced from one another about the reference axis and each of the single valving elements have a pilot valve disposed between the single valving element and the associated single electrically controlled actuator and is operative in response to the single electrically controlled actuator to move the single valving element between its operative positions.

8. The variable displacement fluid translating device of claim 2 wherein each of the plurality of pistons and pressure chambers are evenly spaced from one another about the reference axis and each of the valving arrangements includes first and second valving assemblies and the electrically controlled actuator arrangement includes associated first and second electrically controlled actuators.

9. The variable displacement fluid translating device of claim 8 wherein, the first valving assembly is disposed between the associated pressure chamber and the first inlet/outlet port and the second valving assembly is disposed between the associated pressure chamber and the second inlet/outlet port.

10. The variable displacement fluid translating device of claim 9 wherein each of the first and second valving assemblies are movable in response to actuation of the respective electrically controlled actuators between flow blocking and flow passing positions.

11. The variable displacement fluid translating device of claim 10 including a pressure relief valve connected between the respective pressure chambers and one of the first and second inlet/outlet ports.

12. The variable displacement fluid translating device of claim 11 wherein each of the first and second valving assemblies includes a poppet valve connected to the associated electrically controlled actuator.

13. The variable displacement fluid translating device of claim 12 wherein each of the valving assemblies has a single valve seat and the poppet valve is movable between a seated position and an unseated position.

14. The variable displacement fluid translating device of claim 13 including a pilot control valve disposed between the single valving element and the associated electrically controlled actuator and being operative in response to the electrically controlled actuator to move the single valving element between its flow blocking and flow passing positions.

15. The variable displacement fluid translating device of claim 12 wherein each of the valving assemblies have first and second valve seats and the poppet valve is a ball check movable between the first and second valve seats and operative to block fluid flow in either direction and to permit fluid flow therethrough.

16. The variable displacement fluid translating device of claim 15 including a source of low pressure fluid connected to each of the respective pressure chambers through a restrictive orifice and a one-way check valve.

17. The variable displacement fluid translating device of claim 2 wherein the variable displacement fluid translating device is a fluid pump and is used in combination with a work system having a power source drivingly connected to the fluid pump, a fluid actuator fluidly connected to the fluid pump, a source of low pressure fluid connected to the fluid pump and the first and second inlet/outlet ports, a high pressure accumulator connected to one of the first and second inlet/outlet ports of the fluid pump, and a controller connected to the respective electrically controlled actuators of the fluid pump.

18. The combination of claim 17 wherein the fluid actuator is a second variable displacement fluid translating device.

19. A method of controlling the displacement and the flow direction of fluid within a variable displacement fluid translating device between first and second inlet/outlet ports thereof, comprising the steps:

providing a housing having first and second inlet/outlet ports and a reference axis;

providing a rotating cam having a cam surface in the housing along the reference axis;

forming a plurality of piston bores in the housing about the reference axis;

providing a plurality of pistons in the plurality of piston bores that are slideably disposed in the respective piston bores and that are selectively in mating contact with the cam surface of the rotating cam;

establishing a plurality of pressure chambers between the respective one of the plurality of pistons and the respective ones of the plurality of piston bores; and providing a valving arrangement between selected pressure chamber of the plurality of pressure chambers and the respective first and second inlet/outlet ports, each valving arrangement being operative to selectively control the displacement and the flow direction of pressurized fluid in each pressure chamber relative to both of the first and second inlet/outlet ports.

20. The method of claim 19 wherein the step of providing a plurality of pistons slideably disposed in the plurality of piston bores includes the step of moving the respective pistons a predetermined distance within the associated bore of the plurality of bores and the step of providing a valving arrangement includes the step of controlling the direction of flow into and out of the pressure chamber for only a portion of the predetermined distance.

21. The method of claim 20 wherein the step of providing a valving arrangement between each of the respective pressure chambers and the first and second inlet/outlet ports includes the step of providing two valving assemblies, one of the valving assemblies being disposed between the respective pressure chamber and the first inlet/outlet port and the other one of the valving assemblies being disposed between the respective pressure chamber and the second inlet/outlet port.

22. The method of claim 20 including the step of providing an electrically controlled actuator arrangement connected to each of the valving arrangements.

23. The method of claim 19 including the step of providing a controller operatively connected to the fluid translating device and a speed and position sensor operative to sense the speed of and the rotational position of the fluid translating device and direct a signal representative thereof to the controller.

* * * * *